US005705447A

United States Patent [19]
Kubo

[11] Patent Number: 5,705,447
[45] Date of Patent: Jan. 6, 1998

[54] OIL ABSORBING CLEANING MEMBER

[75] Inventor: Takahiro Kubo, Tokyo, Japan

[73] Assignee: Canon Kabushiki Kaisha, Tokyo, Japan

[21] Appl. No.: 592,885

[22] Filed: Jan. 24, 1996

Related U.S. Application Data

[62] Division of Ser. No. 381,288, Jan. 31, 1995, Pat. No. 5,534,983, which is a continuation of Ser. No. 213,584, Mar. 16, 1994, abandoned.

[30] Foreign Application Priority Data

Mar. 19, 1993 [JP] Japan .................................... 5-083782

[51] Int. Cl.[6] ............................ B32B 3/02; A46B 15/00; B21B 45/02

[52] U.S. Cl. ........................ 442/334; 442/340; 15/256.51; 15/256.52; 100/102; 100/174; 101/423; 101/425; 118/203; 355/271

[58] Field of Search .............................. 15/256.5, 256.51, 15/256.52, 256.53, 256.6; 100/102, 174; 101/423, 425; 118/203; 355/271; 442/334, 340

[56] References Cited

U.S. PATENT DOCUMENTS 5,069,128 12/1991 Hara et al. .......................... 355/300 X
5,406,364 4/1995 Maeyama et al. ...................... 355/296

FOREIGN PATENT DOCUMENTS 4-361288 12/1992 Japan .

*Primary Examiner*—Terrel Morris
*Attorney, Agent, or Firm*—Fitzpatrick, Cella, Harper & Scinto

[57] ABSTRACT

A cleaning device for cleaning a recording material bearing member has a surface contacting with the recording material bearing member. The surface as a non-woven cloth including fibers having an average thickness of below 10 µm and 70% or more of said fibers each has a thickness smaller than 10 µm and a density of said fibers being in a range of 0.05–0.80 g/cm$^3$.

4 Claims, 8 Drawing Sheets

FIG. 4

| DENSITY OF UNWEAVEN CLOTH ( $g/cm^3$ ) | 0.02 | 0.05 | 0.08 | 0.1 | 0.15 | 0.2 | 0.3 | 0.4 | 0.5 | 0.6 | 0.7 | 0.8 | 0.9 | 1.0 |
|---|---|---|---|---|---|---|---|---|---|---|---|---|---|---|
| | × | △ | △ | ○ | ○ | ○ | ○ | ○ | ○ | △ | △ | △ | × | × |

OIL ABSORBING CLEANING MEMBER

This application is a division of application Ser. No. 08/381,288 filed Jan. 31, 1995, U.S. Pat. No. 5,534,983, which is a continuation of application Ser. No. 08/213,584 filed Mar. 16, 1994, (now abandoned).

BACKGROUND OF THE INVENTION

1. Field of the Invention

The present invention relates to an image forming apparatus such as a copying machine, a printer and the like, and more particularly, it relates to an image forming apparatus capable of forming images on both faces of a recording material.

2. Description of the Related Art

FIG. 10 shows an example of a conventional image forming apparatus in which a full-color image is formed by transferring a plurality of toner images having different colors onto a single recording material in a superposed fashion. This image forming apparatus includes a photosensitive drum (image bearing member) 2 rotatably supported by a body 1 of the apparatus for rotational movement in a direction shown by the arrow. Around the photosensitive drum 2, there are arranged, in order along a rotational direction of the drum, a charge device 3, an optical system 5, a developing means 6, a transfer device 7 and a cleaning device 9.

The optical system 5 comprises an original scanning portion, a color decomposing filter, and a laser beam exposure device for illuminating a color-decomposed light image E or equivalent light image E onto the photosensitive drum 2. By illuminating the light image E for each color onto the photosensitive drum 2 uniformly charged by the charge device 3, an electrostatic latent image is formed on the photosensitive drum 2. The developing means 6 is of rotatable type and includes a rotary member 6*b* rotated around a central shaft 6*a*, and four developing devices (i.e. black developing device 6BK, cyan developing device 6C, magenta developing device 6M and yellow developing device 6Y) mounted on the rotary member. A desired developing device is brought to a developing position where the developing device is opposed to the photosensitive drum 2 by rotating the rotary member 6*b*, so that the electrostatic latent image formed on the photosensitive drum 2 is developed with toner (including resin as a base material) to obtain a toner image.

Then, the toner image on the photosensitive drum 2 is transferred onto a recording material supplied to a transfer position (opposed to the photosensitive drum 2) from a recording material cassette 10 through a sheet path (shown by the desked line in FIG. 10) by a convey system and the transfer device 7. The transfer device 7 comprises a transfer drum 7*a*, a transfer corona charger 7*b*, an adsorb corona charger 7*c* for electrostatically adsorbing the recording material, an adsorb roller 7*d* opposed to the adsorb corona charger, an inner corona charger 7*e* and an outer corona charger 7*f*. Further, a peripheral opening area of the transfer drum 7*a* rotatably supported for driven movement is covered by a cylindrical recording material bearing sheet 7*g* made of dielectric material.

As the transfer drum 7*a* is rotated, the toner images successively formed on the photosensitive drum 2 are successively transferred, by the transfer corona charger 7*b*, onto the recording material adsorbed and born by the recording material bearing sheet 7*g*. In this way, a desired number of color toner images are transferred to the recording material born by the recording material bearing sheet 7*g*, thereby forming a full-color image.

After the desired number of toner images were transferred in this way, the recording material is separated from the transfer drum 7*a* by a separation corona charger 11*a* and a separation pawl 11*b*, and then is sent to a fixing device 12. The fixing device 12 comprises a fixing roller 12*a* and a pressure roller 12*b*. The toner images on the recording material are fuzed and mixed by heat and pressure from the rollers 12*a*, 12*b*, thereby fixing the image to the recording material. In this case, offset preventing oil is coated on a surface of the fixing roller 12*a* so that the toner on the recording material is prevented from adhering to the surface of the fixing roller. Thereafter, the recording material to which the toner image was fixed is discharged onto a discharge tray 13.

On the other hand, after the toner images are transferred to the recording material, residual toner remaining on the photosensitive drum 2 is removed by the cleaning device 9 and residual toner remaining on the recording material bearing sheet 7*g* is removed by a transfer cleaner 15, thereby preparing for the next image formation.

In order to effectively use the resources, it is desirable to reduce the number of recording materials to be used, by forming images on both faces of each recording material. Accordingly, it is desirable to add a both-face image forming function to a full-color image forming apparatus. If the both-face image forming function is added to the above-mentioned full-color image forming apparatus, the following processes will be performed.

The recording material is borne by the transfer drum 7*a* and the toner images are formed on a first face of the recording material. Then, the recording material is sent to the fixing device 12, where the toner images are fixed to the recording material. Then, the recording material is turned over and then is borne by the transfer drum 7*a* again so that the toner image on the first face is contacted with the recording material bearing sheet 7*g*. The toner images are formed on the second face of the recording material and the toner images are fixed to the recording material by the fixing device 12.

However, when the above-mentioned processes are carried out, the offset preventing oil adhered to the recording material during the fixing of the toner images to the recording material is adhered to the recording material bearing sheet. Since the recording material bearing sheet is contacted with the photosensitive drum, the oil adhered to the recording material bearing sheet is transferred to the photosensitive drum.

Thus, when the images are formed on both first and second faces of the recording material, and particularly when a plurality of recording materials are continuously used to form images on their both faces, a great amount of oil will be adhered to the surface of the photosensitive drum 2. In this condition, if the image formation is continued, due to viscosity of the oil, there will arise a "fog" phenomenon that the toner is adhered to a blank area of the recording material which must be kept white. On the other hand, regarding solid areas of the recording material which must be made black, since the oil on the photosensitive drum 2 prevents the toner from transferring from the surface of the photosensitive drum 2 to the recording material, the toner cannot be transferred from the photosensitive drum 2 to the recording material sufficiently, thereby thinning the image.

Although the cleaner 15 is contacted with the surface of the transfer drum 7*a*, the cleaner is of brush type and merely serves to remove the residual toner from the transfer drum, and, thus, cannot remove the oil from the transfer drum.

In mono-color image forming apparatuses wherein a toner image is formed by single color toner, when the both-face image formation is carried out, the above-mentioned problem regarding the adhesion of oil will arise. However, in the full-color image forming apparatus wherein the full-color image is formed by superimposing a plurality of toner images having different colors, since an amount of oil adhered to the recording material is considerably great, the oil adhered to the photosensitive drum particularly affects a bad influence.

SUMMARY OF THE INVENTION

The present invention aims to eliminate the above-mentioned conventional drawbacks, and an object of the present invention is to provide an image forming apparatus which can prevent oil from adhering to a photosensitive member.

Another object of the present invention is to provide an image forming apparatus which can efficiently remove oil adhered to a recording material.

A further object of the present invention is to provide an image forming apparatus in which a cleaning means for cleaning a surface of a recording material bearing member comprises non-woven cloth including fibers having an average thickness smaller than 10 μm so that 70% or more of the fibers each has thickness smaller than 10 μm, a density of the fibers being in a range of 0.05 to 0.08 g/cm$^3$.

Other objects of the present invention will be apparent from the following detailed explanation.

BRIEF DESCRIPTION OF THE DRAWINGS

FIG. 4 is a table showing a relation between density and evaluation of non-woven cloth of the oil cleaning member of FIG. 1;

DETAILED DESCRIPTION OF THE PREFERRED EMBODIMENTS

The present invention will now be explained in connection with embodiments thereof with reference to the accompanying drawings.

(First Embodiment)

Figure 1:
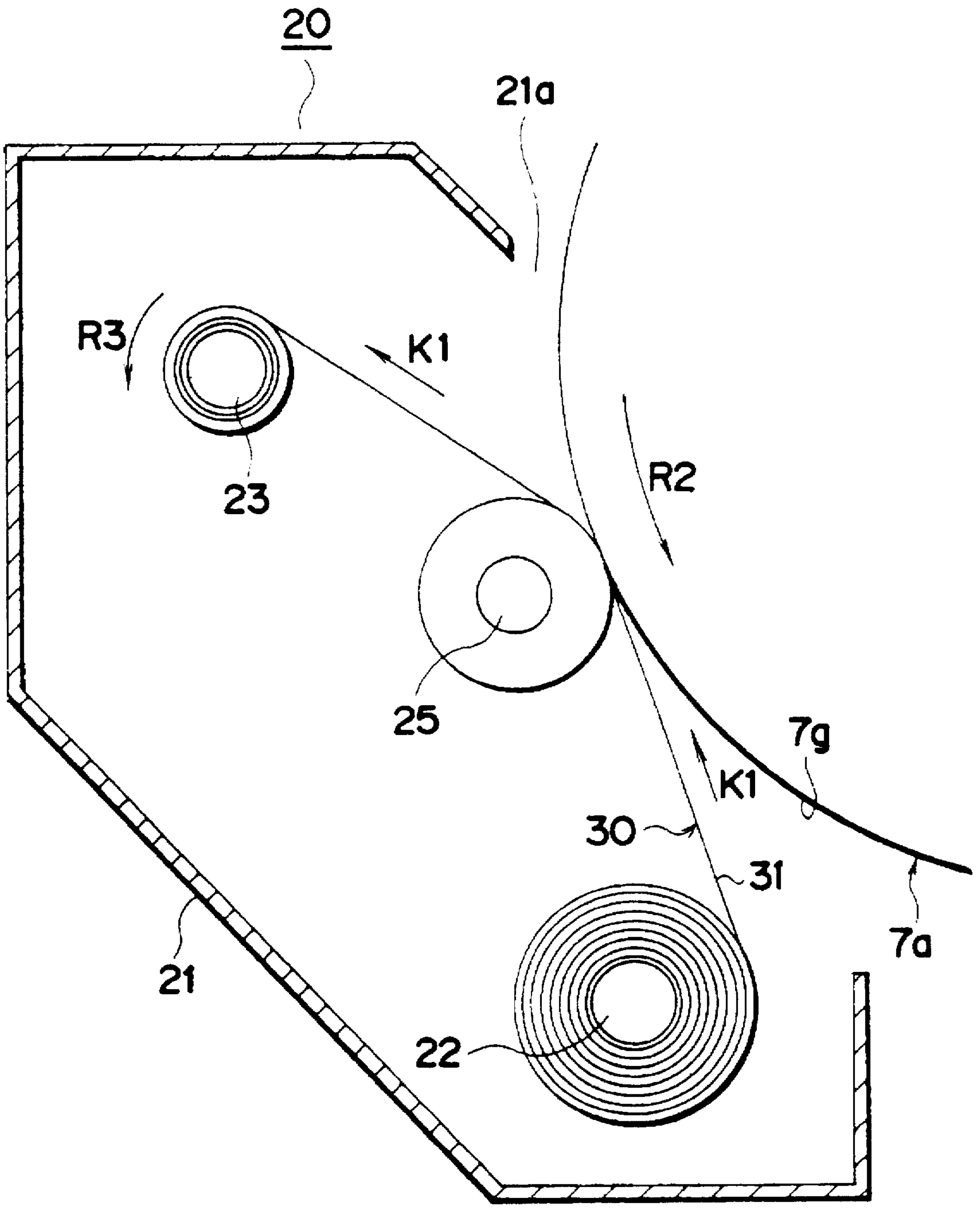
FIG. 1 is an enlarged sectional view of an oil cleaning member and an oil cleaning device according to a first embodiment of the present invention.
Figure 2:
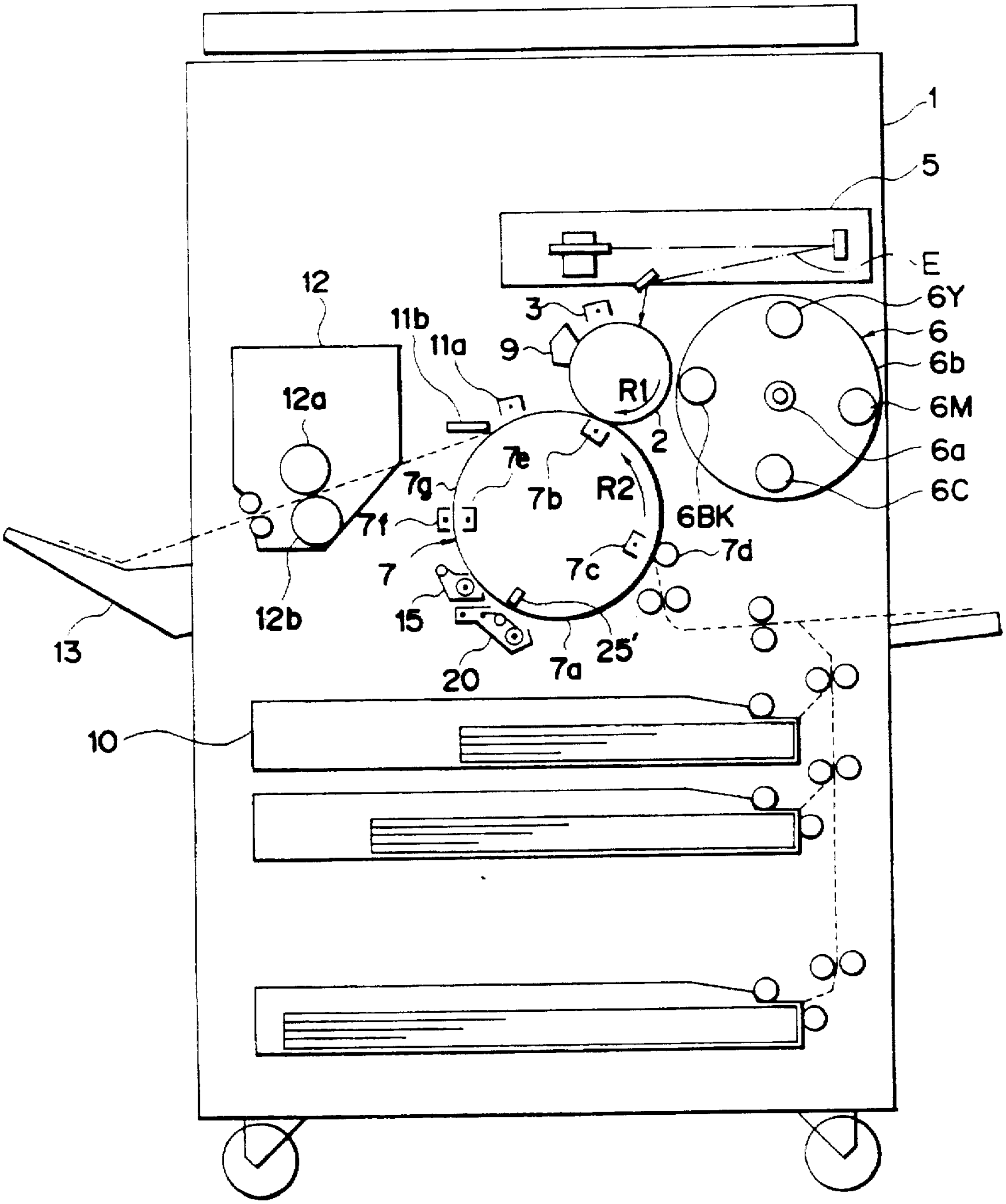
FIG. 2 is a schematic sectional view of a full-color image forming apparatus to which the oil cleaning device of FIG. 1 is mounted.
Figure 10:
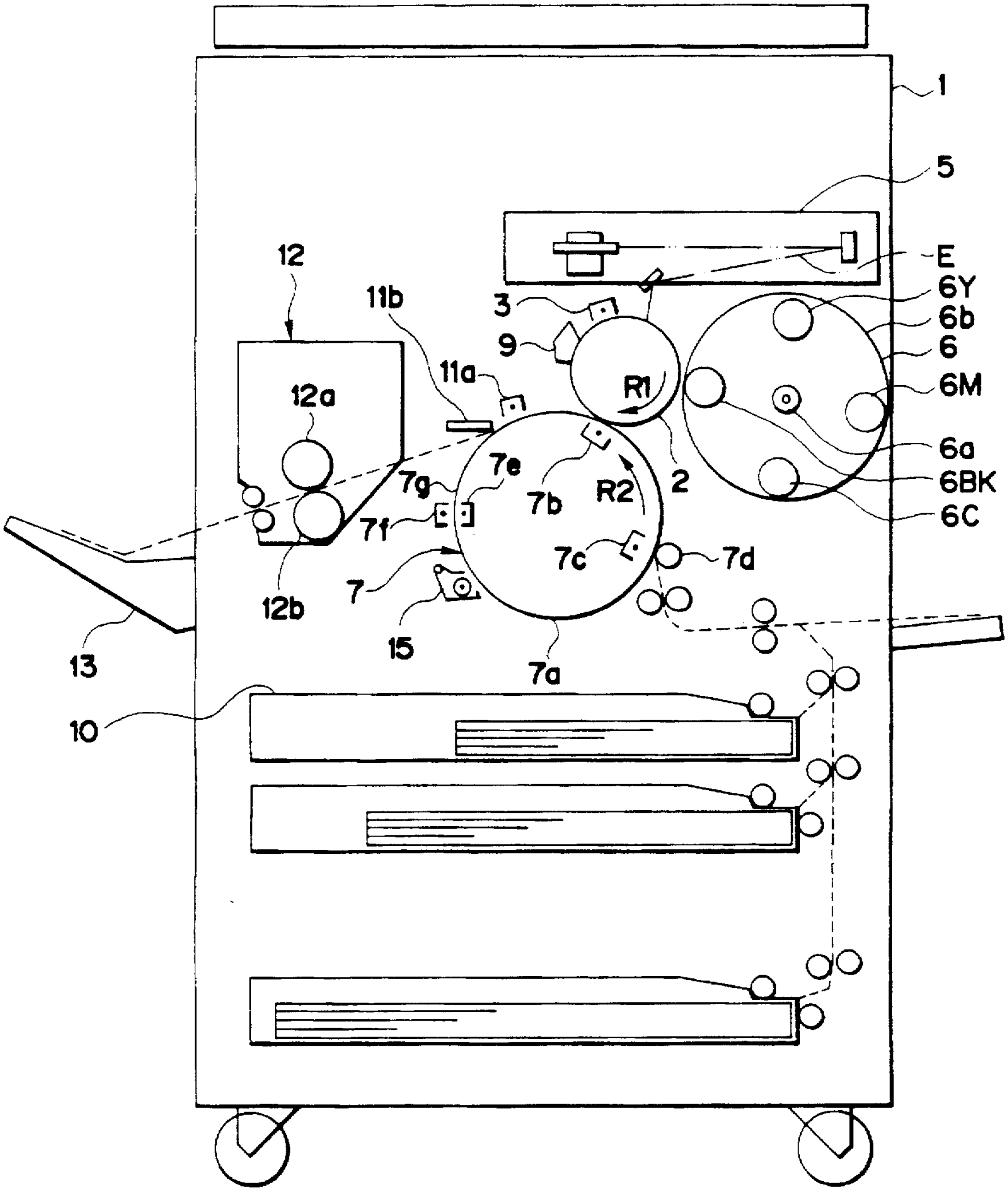
FIG. 10 is a schematic sectional view of a conventional image forming apparatus.

FIG. 1 is an enlarged sectional view of an oil cleaning device 20 having an oil cleaning member and used with an image forming apparatus according to the present invention. FIG. 2 is a schematic sectional view of the image forming apparatus to which the oil cleaning device 20 is mounted (Incidentally, the image forming apparatus shown in FIG. 2 is of the type wherein the oil cleaning device 20 is arranged in the proximity of the transfer cleaner 15 of the conventional image forming apparatus shown in FIG. 10, and the same constructural elements as those of the apparatus of FIG. 10 are designated by the same reference numerals and explanation thereof will be omitted).

As shown in FIG. 1, the oil cleaning device 20 comprises a cleaning container 21 having an opening 21*a* which is oriented obliquely. An upper core 23 and a lower core 22 are rotatably arranged within the cleaning container 21. Further, an urging roller 25 is arranged between the cores 22, 23 to be opposed to a central portion of the opening 21*a*. An oil cleaning member 30 according to the present invention is in the form of a strip. At least a sweeping surface of the strip contacted with a recording material bearing sheet 7*g* is constituted by a sweeping cloth formed from non-woven cloth 31. The oil cleaning member 30 has one end attached to the lower core 22 and the other end attached to the upper core 23 and wound around the lower core 22.

When the upper core 23 is rotated in a direction shown by the arrow R3, the oil cleaning member 30 is gradually unwound from the lower core 22 in a direction shown by the arrow K1 and is gradually wound around the upper core 23. The entire oil cleaning device 20 is arranged in such a manner that the opening 21*a* is opposed to the recording material bearing sheet 7*g* of a transfer drum 7*a*. Further, the oil cleaning device is pivotally supported by a drive member (not shown) so that a portion of the cleaning member 30 supported by the urging roller 25 can be engaged by and disengaged from the surface of the recording material bearing sheet 7*g*. The sweeping cloth 31 is contacted with the surface of the recording material bearing sheet 7*g* rotating in a direction shown by the arrow R2 with a predetermined urging force and the upper core 23 is rotated in the direction shown by the arrow R3. As a result, the oil cleaning member 30 is shifted in the direction shown by the arrow K1 so that the sweeping cloth 31 is slidably contacted with the surface of the recording material bearing sheet 7*g* rotating in the direction R2, thereby scraping or removing the oil adhered to the surface of the recording material bearing sheet (oil adhered to the transfer drum 7*a* from the fixing device 12 through the recording material).

A back-up brush 25' is arranged in a confronting relation to the urging roller 25 with the interposition of the bearing sheet 7*g* and is contacted with a back surface of the bearing sheet. In this condition, the sweeping cloth 31 is urged against the bearing sheet 7*g* with an urging force of 1.2 kg (weight) by the urging roller 25 and the back-up brush 25', and the sweeping cloth 31 is shifted (in the same direction as the bearing sheet 7*g*) with a relative speed of 80% regarding a shifting speed of the bearing sheet 7*g*. Incidentally, it was found, from tests, that the urging force between the bearing sheet 7*g* and the sweeping cloth 31 is preferably in a range of 0.6 to 5 kg (weight). Further, it was found, from tests, that the relative shifting speed of the sweeping cloth 31 regarding the bearing sheet 7*g* is in a range of 65 to 95% or 105 to 150%.

After the oil was removed, or when the oil is not required to be removed because the image is formed on only one face of the recording material, the oil cleaning device 20 is retarded from the transfer drum *7a* to separate the oil cleaning member 30 from the recording material bearing sheet 7*g*, and the upper core 23 is stopped, thereby stopping the movement of the oil cleaning member 30 in the direction K1. For example, the removal of oil by means of the oil cleaning member. 30 is preferably performed during one revolution of the recording material bearing sheet 7*g* after the recording material on the second face of which the image was formed is separated from the bearing sheet 7*g* so that a portion of the recording material bearing sheet 7*g* to which the oil was adhered is not contacted with the surface of the photosensitive drum 2. That is to say, as shown in FIG. 2, immediately after the recording material is separated from the recording material bearing sheet 7*g* by the separation pawl 11*b* and the like, the oil on the recording material bearing sheet 7*g* is removed by the oil cleaning member 30 according to the present invention so that, when the recording material bearing sheet 7*g* is rotated by about a half of one revolution to be contacted with the photosensitive drum 2 at the transfer position, the oil is completely removed from the surface of the recording material bearing sheet 7*g*. By removing the oil from the recording material bearing sheet 7*g* by the oil cleaning member 30 in this way, it is possible to prevent the oil from transferring from the recording material bearing sheet 7*g* to the surface of the photosensitive drum 2.

Next, the sweeping cloth 31 of the oil cleaning member 30 will be described. In the illustrated embodiment, the sweeping cloth 31 is formed from the following non-woven cloth:

| | |
|---|---|
| Material of fiber: | synthetic resin consisting of nylon and polyester; |
| Thickness of fiber: | 4 μm (in average); |
| Density of non-woven cloth: | 0.17 g/cm³ (about 90% of fibers have thickness smaller than 10 μm); |
| Average distance between fibers: | 2.5 μm; |
| Structure: | only one layer; and |
| Thickness of non-woven cloth: | 500 μm. |

When the oil cleaning member 30 having such a non-woven cloth 31 is used in the oil cleaning device 20 shown in FIG. 1 to remove the oil adhered to the recording material bearing sheet 7*g* of the transfer drum 7*a*, it was found that the oil is substantially completely removed.

Figure 3:
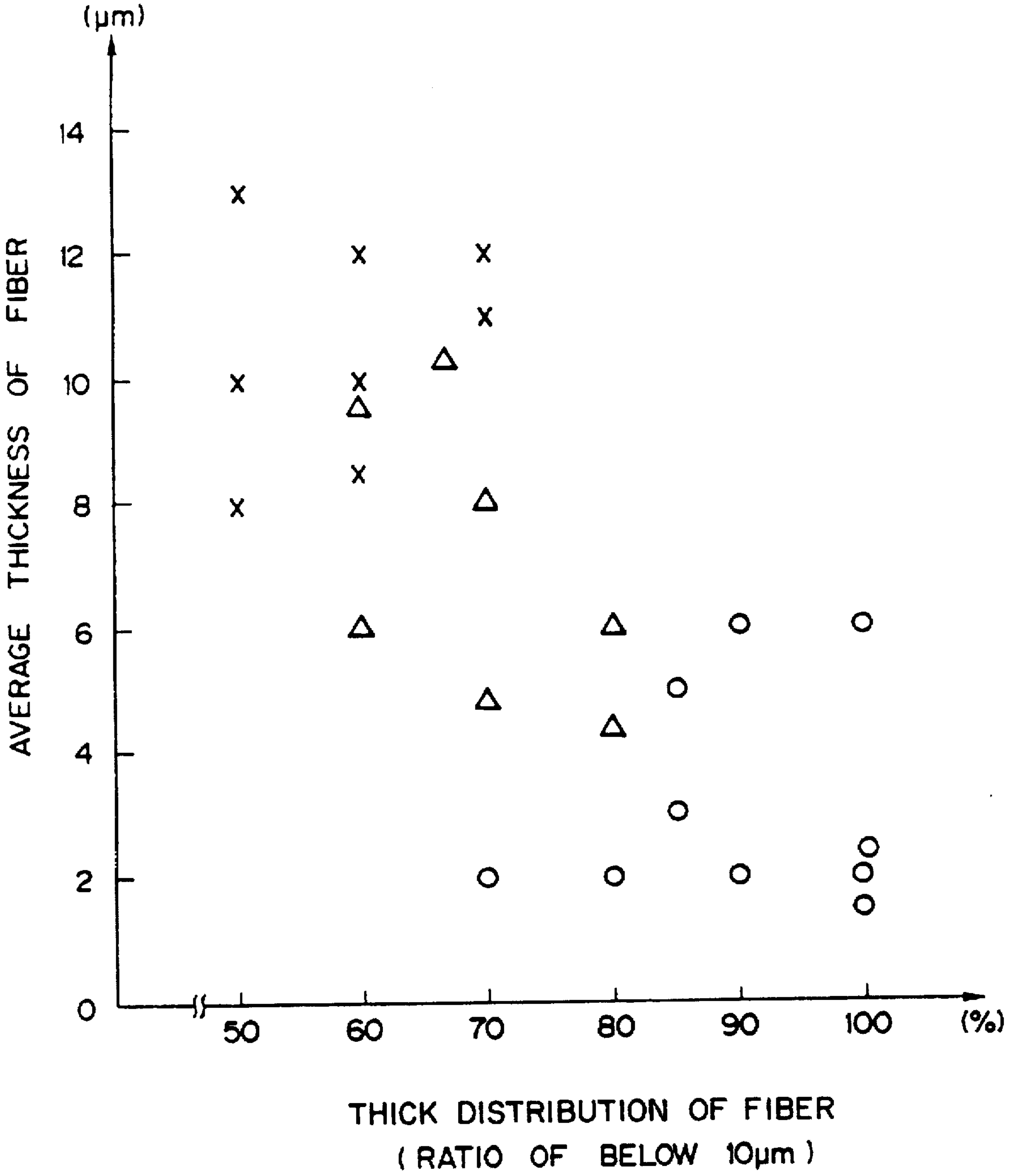
FIG. 3 is a graph showing a relation between average thickness and thick distribution of fibers of the oil cleaning member of FIG. 1.

The reason that the above-mentioned non-woven cloth 31 is used in this embodiment is based on a graph of FIG. 3 and a table of FIG. 4 showing test data. In FIGS. 3 and 4, various symbols represent the following facts:

○: oil was removed completely;

Δ: oil was not completely removed, but the oil did not affect a bad influence upon the image; and x: In practice, oil affected a bad influence upon the image.

Incidentally, upon examination of the graph and table, although relative conditions therebetween ("thick distribution of fiber" and "density of non-woven cloth", and the like) is not negligible, the graph and table show the data obtained under the best relative conditions.

On the other hand, the material of fibers forming the non-woven cloth 31 may be polypropylene, layon, acryl, nylon, polyester, vinylon or synthetic resins comprised of these materials, as well as ones used in this embodiment. Particularly, since it is preferable that the fibers themselves have high oil adsorbing ability, the composition of the fiber has preferably lipophilic group at its end. Among the above-mentioned materials, although polypropylene has the strongest lipophilic group ($CH_3CHCH_2$—) and high oil adsorbing ability, if the fibers are made of polypropylene, since the binding force between the fibers is relatively weak, adequate durability cannot be obtained. Thus, most preferably, the fibers are made of nylon or polyester which have good durability (but have lipophilic groups weaker than that of polypropylene ).

Further, in place of the non-woven cloth 31, the above-mentioned materials were appropriately woven to obtain woven cloths and the same tests as the above-mentioned test were carried out by using such woven cloths. As a result, it was found that, regarding each woven cloth, there arises unevenness in the oil removing area along a woven direction, and thus, when such a woven cloth is used as the oil cleaning member 30, a range of the setting condition therefor becomes narrower (i.e. such woven cloth is not preferable to use as the oil cleaning member).

Next, the good setting condition will be explained with reference to the graph of FIG. 3.

In FIG. 3, the ordinate indicates average thickness of fiber constituting the non-woven cloth and the abscissa indicates thick distribution of fiber constituting the non-woven cloth (ratio of below 10 μm).

The non-woven cloth used in this case is obtained by binding fibers by means of an adhesive under predetermined pressure. Incidentally, such fibers are obtained by injecting the aforementioned material from a nozzle having a predetermined injection opening (below 10 μm).

Further, the thickness of the fiber is measured under JIS standard (P8120). That is to say, the bound fibers in the non-woven cloth are disassembled by a predetermined method and the thickness of the disassembled fiber is measured by a microscope.

From FIG. 3, it was found that when the average thickness is below 10 μm (preferably, below 6 μm) and the ratio of below 10 μm in the thick distribution is above 70% (preferably, above 85%), the excellent oil removing ability can be obtained. As the reason, it is considered that the fiber having the great thickness is likely to scrape particles of oil (in the illustrated embodiment, silicone oil (viscosity of 300 centi-stokes) having good heat resistance and good mold-releasing ability) from the recording material bearing sheet in comparison with the fiber having the small thickness.

Next, a relation between the density of fibers in the non-woven cloth 31 and the oil removing ability will be explained with reference to FIG. 4. Incidentally, the density of the fibers was measured under JIS standard (P8118) (In this case, however, thickness of the non-woven cloth was measured by a micrometer under pressure of about 0.02 kgf/cm²). That is, when the thickness of the non-woven cloth is T (mm) and the weight of the non-woven cloth is W (g/cm²), the density D (g/cm³) is calculated from the following equation:

$$D=W/(T\times1000)$$

From FIG. 4, it was found that when the density of fibers is in a range of 0.05 to 0.80 g/cm³ (preferably, 0.1 to 0.5 g/cm³) the excellent oil removing ability can be obtained. As the reason, it is considered that, if the density of fibers is small, a distance between the fibers becomes too long to reduce the silicone oil particle scraping area, and, if the density of fibers is great, the oil particle cannot enter into a space between the fibers.

Incidentally, in the illustrated embodiment, while an example that the recording material bearing sheet is made of polycarbonate was explained, the present invention is not limited to this example, but the recording material bearing sheet may be formed from any dielectric sheet such as a PVdF sheet.

(Second Embodiment)

In the above first embodiment, the oil removing ability was determined from factors regarding the fibers constituting the non-woven cloth 31 (i.e. average thickness, thick distribution, and density of the non-woven cloth). Further, from the tests, it was found that, if an average distance between the fibers constituting the non-woven cloth 31 is greater than an average particle diameter of toner used in this case, the spaces between the fibers (in which the oil should be held) are apt to be filled with the toner scattered in the apparatus and adhered to the bearing sheet 7*g*, thereby greatly reducing the oil removing ability. Now, the average distance between the fibers is referred to as an average of diameters of inscribed circles. In this case, the condition of the surface (1 $cm^2$) of the non-woven cloth is sent to a memory of an image analyzing device by a CCD to judge projections and recesses on the surface by utilizing the difference in brightness, and circles are inscribed in the recesses to obtain the inscribed circles.

In this second embodiment, the average distance (4.5 μm in this embodiment) between the fibers constituting the non-woven cloth 31 is made smaller than the average diameter (8.5 μm) of the toner used in this case while maintaining the same condition as that of the first embodiment, thereby ensuring excellent oil removing ability for a long time.

(Third Embodiment)

Figure 5:
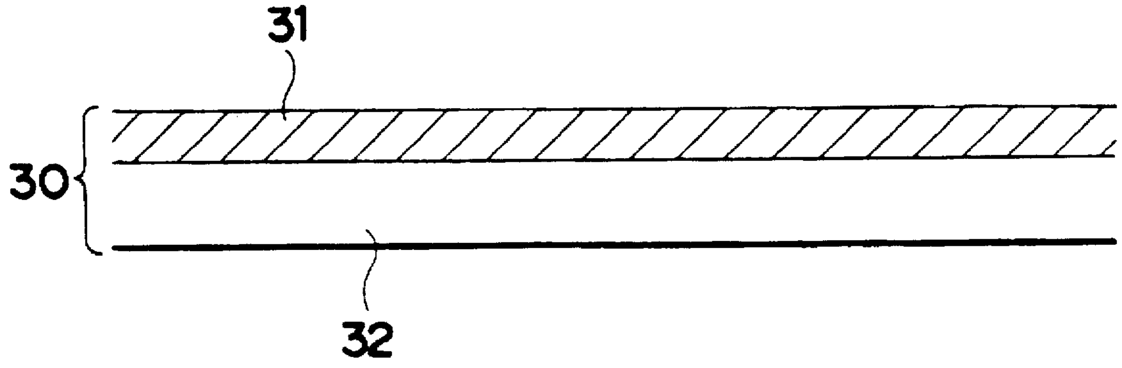
FIG. 5 is an enlarged sectional view of an oil cleaning member according to a third embodiment of the present invention.

In order to further enhance the effect of the present invention, the oil removed from the recording material bearing sheet 7*g* should not be held on the surface of the oil cleaning member 30, but may be adsorbed in the oil cleaning member. FIG. 5 shows an oil cleaning member 30 having such a function.

In FIG. 5, the oil cleaning member 30 comprises an upper oil removing layer (non-woven cloth) 31 and a lower oil adsorbing layer (another non-woven cloth as a base member) 32. The oil removing layer 31 is formed from the non-woven cloth (having density of 0.17 $g/cm^3$ ) described in connection with the first embodiment. The oil adsorbing layer 32 is formed from a non-woven cloth having density (0.10 $g/cm^3$) smaller than that of the oil removing layer 31. Since the smaller the density the greater the distance between the fibers to permit the reservation of oil, the low density cloth has oil holding ability greater than the high density cloth. With this arrangement, the oil removed by the oil removing layer 31 is adsorbed in the lower oil adsorbing layer 32, thereby removing the oil more effectively.

(Fourth Embodiment )

In the above first to third embodiments, while the strip-shaped non-woven cloth 31 was used as the oil cleaning member 30, in place of the strip-shaped non-woven cloth, a cleaning member 30 may be obtained by forming non-woven cloth 31 in a form of a roller. Further, by forming the non-woven cloth 31 in the form of the roller, the entire oil cleaning device 20 can be simplified.

Figure 6:
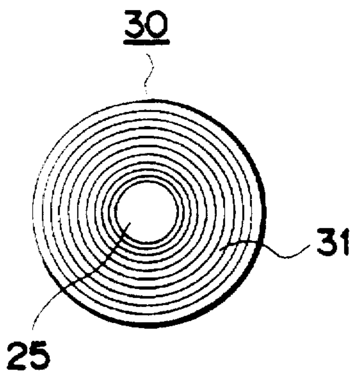
FIG. 6 is an enlarged sectional view showing a construction of an oil cleaning member according to a fourth embodiment of the present invention.

FIG. 6 shows an example of such a roller-shaped oil cleaning member 30. In this example, the non-woven cloth 31 described in connection with the first embodiment is wound around a core 25 to obtain a desired outer diameter.

Figure 7:
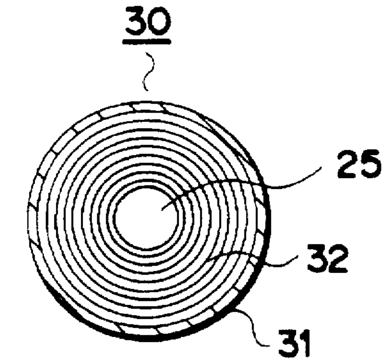
FIG. 7 is an enlarged sectional view showing a construction of an oil cleaning member according to an alteration of the fourth embodiment.

On the other hand, FIG. 7 shows another example of a roller-shaped oil cleaning member 30 incorporating the third embodiment therein. In this example, the low density non-woven cloth 32 acting as the oil adsorbing layer is wound around a core 25 and the non-woven cloth 31 acting as the oil removing layer is wound around the non-woven cloth 32 as a single layer.

Figure 8:
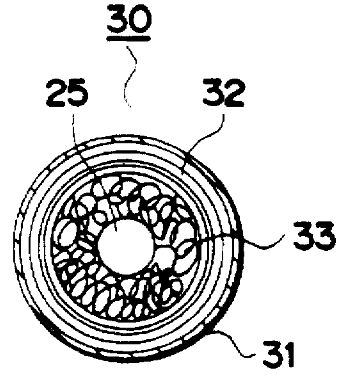
FIG. 8 is an enlarged sectional view showing a construction of an oil cleaning member according to a further alteration of the fourth embodiment.

Alternatively, FIG. 8 shows a further example of a roller-shaped oil cleaning member 30. In this example, a sponge layer 33 is wound around a core 25, the low density non-woven cloth 32 acting as the oil adsorbing layer is wound around the sponge layer, and the non-woven cloth 31 acting as the oil removing layer is wound around the non-woven cloth 32. By using the sponge layer 33, a nip between the oil cleaning member 30 and the recording material bearing sheet 7*g* generated when the oil cleaning member 30 is contacted with the recording material bearing sheet 7*g* can be widened, thereby increasing the oil cleaning effect.

It was found that the oil removing ability is achieved by these rollers.

Incidentally, the urging force between the roller-shaped oil cleaning member and the bearing sheet 7*g*, and the relative peripheral speed of the roller-shaped oil cleaning member regarding the shifting speed of the bearing sheet 7*g* may be the same as those in the first embodiment.

(Fifth Embodiment)

Figure 9:
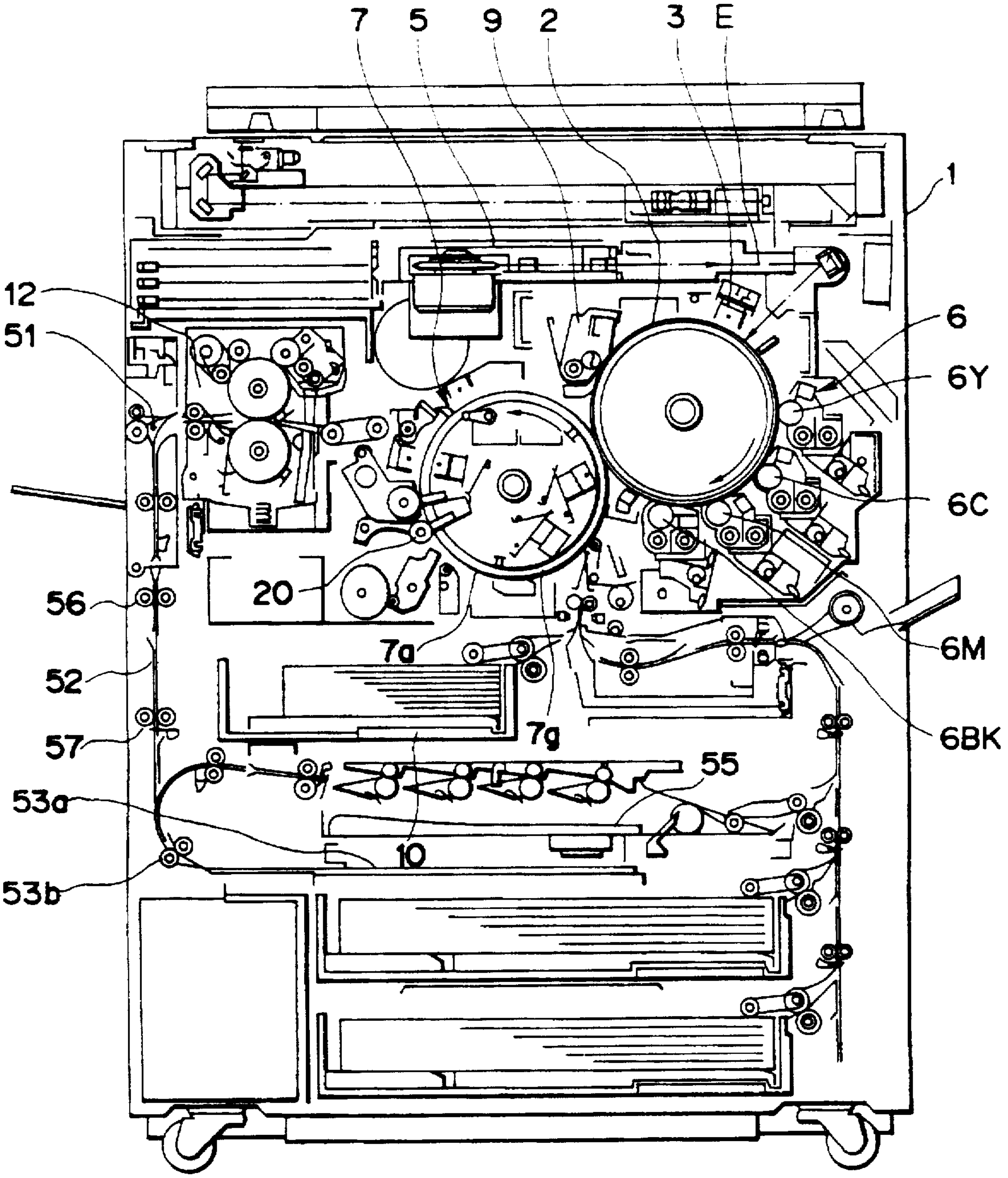
FIG. 9 is a schematic sectional view of an image forming apparatus with an oil cleaning member for removing oil adhered to a recording material.

In the above first to fourth embodiments, while an example that the oil cleaning member 30 according to the present invention is urged against the transfer drum 7*a* to remove the oil from the transfer drum 7*a* (i.e. an example that the oil cleaning member is used as an oil cleaning device for the transfer drum) was explained, alternatively, the oil cleaning member 30 may be directly contacted with the recording material to remove the oil from the recording material. FIG. 9 shows an example of a full-color image forming apparatus in which the oil cleaning member is directly contacted with the recording material. Only both-face image formation will be explained herein.

In FIG. 9, when images are formed on both faces of the recording material, the recording material on one face of which the image was formed is discharged from a fixing device 12, conveyed past a gate 51, and introduced into a reverse rotation path 53*a*. Then, by rotating a reverse rotation roller 53*b* reversely, the recording material is returned from the reverse rotation path 53*a* in a reverse direction to be sent to an intermediate tray 55. Thereafter, an image is formed on a second face of the recording material by a similar image forming process.

In this case, when convey rollers 56, 57 disposed in a longitudinal convey path 52 are constituted by the roller-shaped oil cleaning members 30 according to the fourth embodiment shown in FIGS. 6 to 8, immediately after the toner image on the first face was fixed to the recording material, the oil can be removed from the recording material. Thus, during the image formation regarding the second face of the recording material, even when the recording material is wound around the transfer drum 7*a*, the oil is not adhered to the surface of the recording material bearing sheet 7*g*. In this case, however, the peripheral speeds of the convey rollers 56, 57 must be substantially the same (preferably, exactly the same) as the conveying speed of the recording material, because, if these speeds are different from each other, the toner fixed to the first face of the recording material is rubbed by the convey rollers 56, 57, thereby distorting the image.

Of course, by using the oil cleaning member 30 for removing the oil from the transfer drum 7*a* in combination with such convey rollers 56, 57, the oil removing effect can be further improved.

As mentioned above, according to the present invention, since the non-woven cloth including the fibers having the average thickness of below 10 μm (70% or more of the fibers having the thickness of 10 μm or less) and the density of 0.05 to 0.80 $g/cm^3$ is provided as the sweeping surface of the oil cleaning member for removing the oil adhered to the surfaces of the recording material bearing sheet and the recording material, the oil removing ability is improved, thereby preventing the oil from adhering to the photosensitive member.

Incidentally, in the above-mentioned embodiments, while the full-color image forming apparatus was explained, the present invention can be applied to any mono-color image forming apparatuses.

The present invention is not limited to the aforementioned embodiments, and various alterations and modifications can be effected within the scope of the present invention.

What is claimed is:

1. A cleaning member adapted to abut a member having oil adhered thereon, comprising:

a surface layer in contact with the member having oil adhered thereon, said surface layer adsorbing the oil adhered on the member; and an inner layer disposed at a side away from the member relative to said surface layer for adsorbing the oil adhered on the member, wherein an oil adsorbing ability of said inner layer is larger than that of said surface layer; and wherein said surface layer is a non-woven cloth, wherein said non-woven cloth is made of fibers an average thickness of which is smaller than 10 μm, and 70% or more of said fibers each has a thickness smaller than 10 μm and a density of said fibers being in a range of 0.05–0.80 g/cm$^3$.

2. A cleaning member according to claim 1, wherein the density of said inner layer is smaller than the density of said surface layer.

3. A cleaning member according to claim 1, wherein said cleaning member has a roller shape in which said inner layer is disposed inside of said surface layer.

4. A cleaning member according to claim 3, wherein said inner layer comprises a sponge layer.

* * * * *

UNITED STATES PATENT AND TRADEMARK OFFICE

CERTIFICATE OF CORRECTION

PATENT NO. : 5,705,447
DATED : January 6, 1998
INVENTOR(S) : Takahiro Kubo

It is certified that error appears in the above-indentified patent and that said Letters Patent is hereby corrected as shown below: On the title page, item:

[56] References Cited

U.S. Patent Documents

Change "

| | | | |
|---|---|---|---|
| 5,069,128 | 12/1991 | Hara et al. .......... | 355/300 X |
| 5,406,364 | 4/1995 | Maeyama et al......... | 355/296 |

"

to --

| | | | |
|---|---|---|---|
| 3,435,481 | 4/1969 | Kessler ................ | 15/215 |
| 4,359,963 | 11/1982 | Saito et al. ............ | 118/60 |
| 4,375,505 | 3/1983 | Newkirk ................ | 430/99 |
| 4,397,936 | 8/1983 | Sakata et al. .......... | 430/124 |
| 4,530,140 | 7/1985 | Okamura et al. .......... | 29/110 |
| 4,684,562 | 8/1987 | Hartkemeyer ............ | 428/182 |
| 4,753,843 | 6/1988 | Cook et al. ............ | 428/286 |
| 4,909,355 | 3/1990 | Ramos ................. | 428/137 |
| 5,069,128 | 12/1991 | Hara et al. ............ | 355/300 X |
| 5,186,831 | 2/1993 | DePetris .............. | 210/242.4 |
| 5,270,089 | 12/1993 | Alston et al. .......... | 428/60 |
| 5,406,364 | 4/1995 | Maeyama et al...... .... | 355/296 |
| 5,500,267 | 3/1996 | Canning ................ | 428/43 |
| 5,534,983 | 7/1996 | Kubo .................. | 355/271 |

UNITED STATES PATENT AND TRADEMARK OFFICE
CERTIFICATE OF CORRECTION

PATENT NO. : 5,705,447
DATED : January 6, 1998
INVENTOR(S) : Takahiro Kubo

It is certified that error appears in the above-indentified patent and that said Letters Patent is hereby corrected as shown below:

FOREIGN Patent Documents

Change "

4-361288 12/1992 Japan . "

To --

4-361288 12/1992 Japan .
58-221145 12/1983 Japan . --.

DRAWING SHEETS

Sheet 4 of 8

Figure 4

"UNWEAVEN" should read --UNWOVEN--.

IN THE DISCLOSURE

Column 1

Line 52, "desked" should read --dashed--.
Line 65, "born" should read --borne--.

Column 2

Line 1, "born" should read --borne--.
Line 9, "fuged" should read --fused--.

UNITED STATES PATENT AND TRADEMARK OFFICE

CERTIFICATE OF CORRECTION

PATENT NO. : 5,705,447
DATED : January 6, 1998
INVENTOR(S) : Takahiro Kubo

It is certified that error appears in the above-indentified patent and that said Letters Patent is hereby corrected as shown below:

Column 4

Line 11, "constructural" should read --constructional--.

Column 5

Line 1, "retarded" should read --retracted--.
Line 6, "member." should read --member--.
Line 60, "layon," should read --rayon,--.

Column 6

Line 56, "the" should be deleted.

Signed and Sealed this

Twenty-sixth Day of January, 1999

Attest:

Attesting Officer

*Acting Commissioner of Patents and Trademarks*